Oct. 4, 1938.   C. A. WARDEN   2,132,332
CAR SKID
Filed Dec. 10, 1935   3 Sheets-Sheet 1
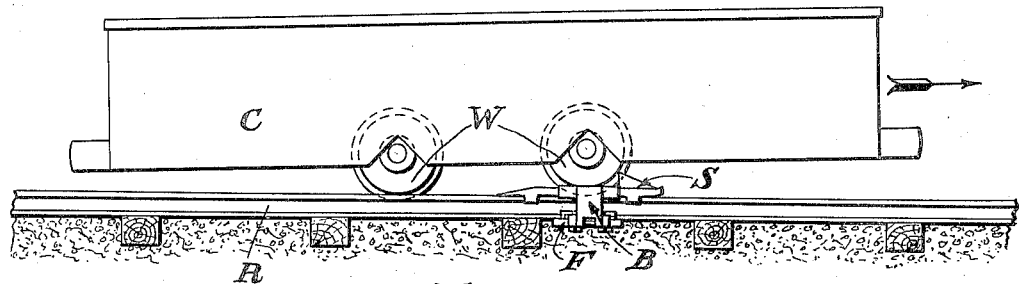
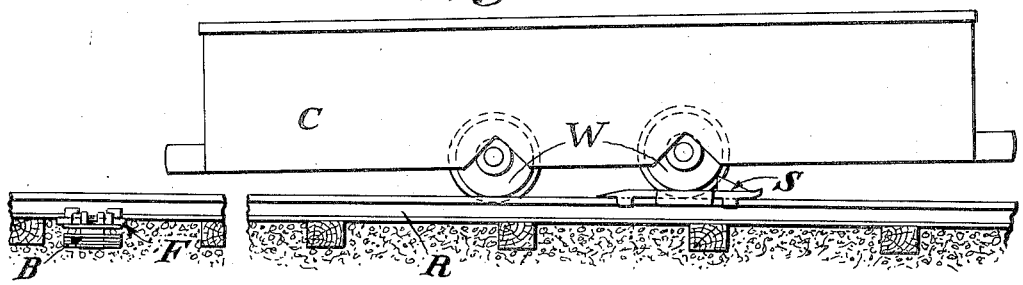
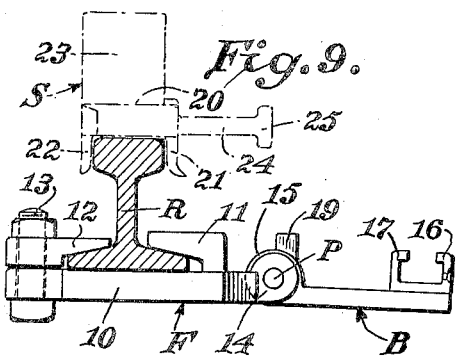
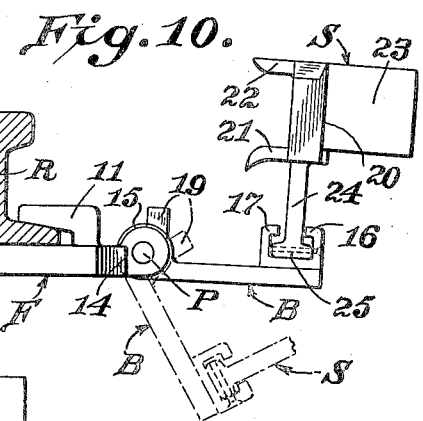
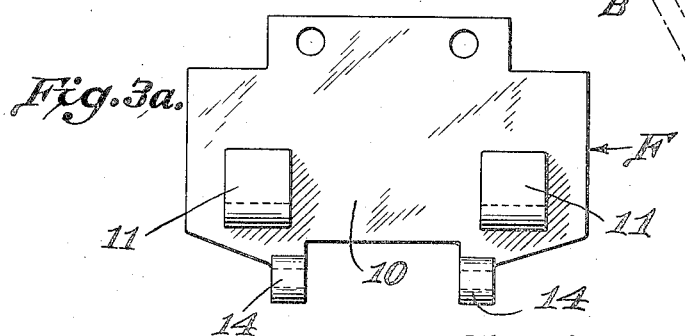

Oct. 4, 1938. C. A. WARDEN 2,132,332
CAR SKID
Filed Dec. 10, 1935  3 Sheets-Sheet 2
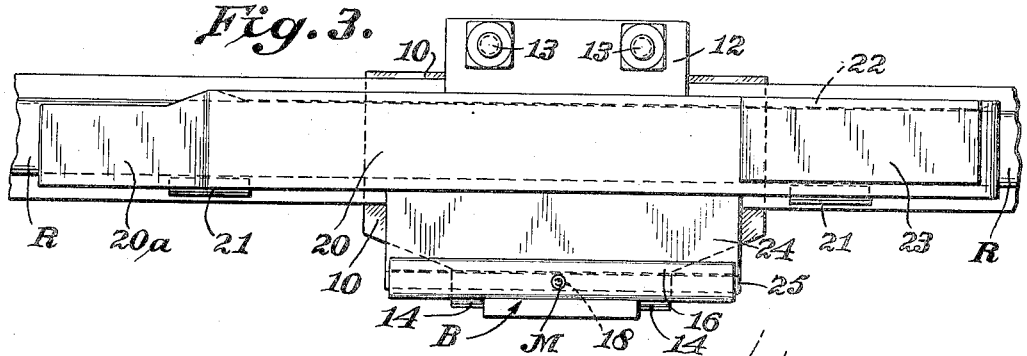
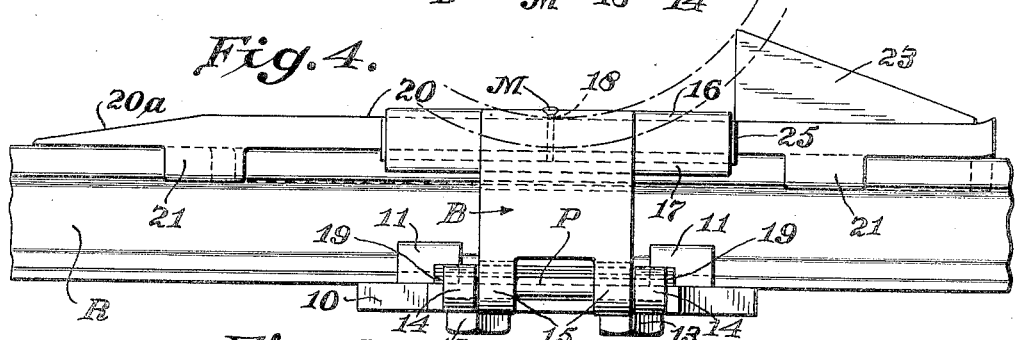
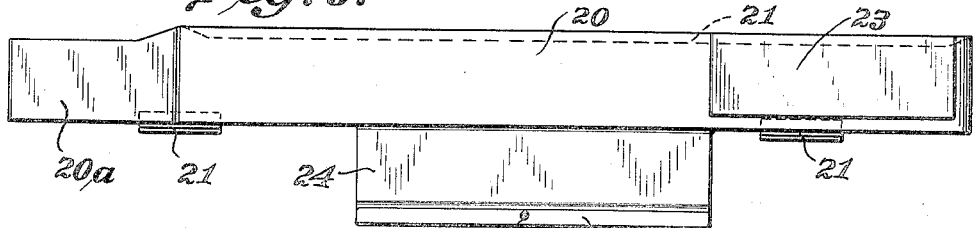
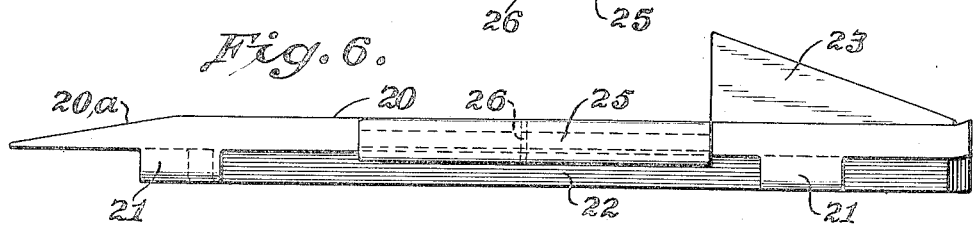
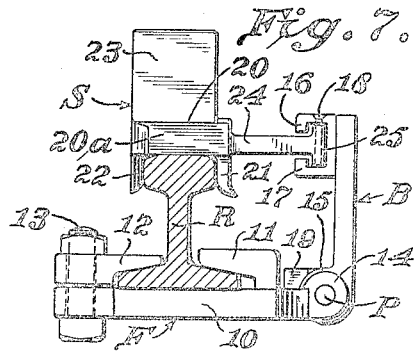
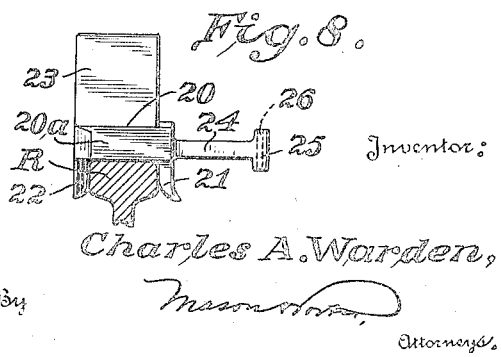
Inventor:
Charles A. Warden,
By
Attorneys

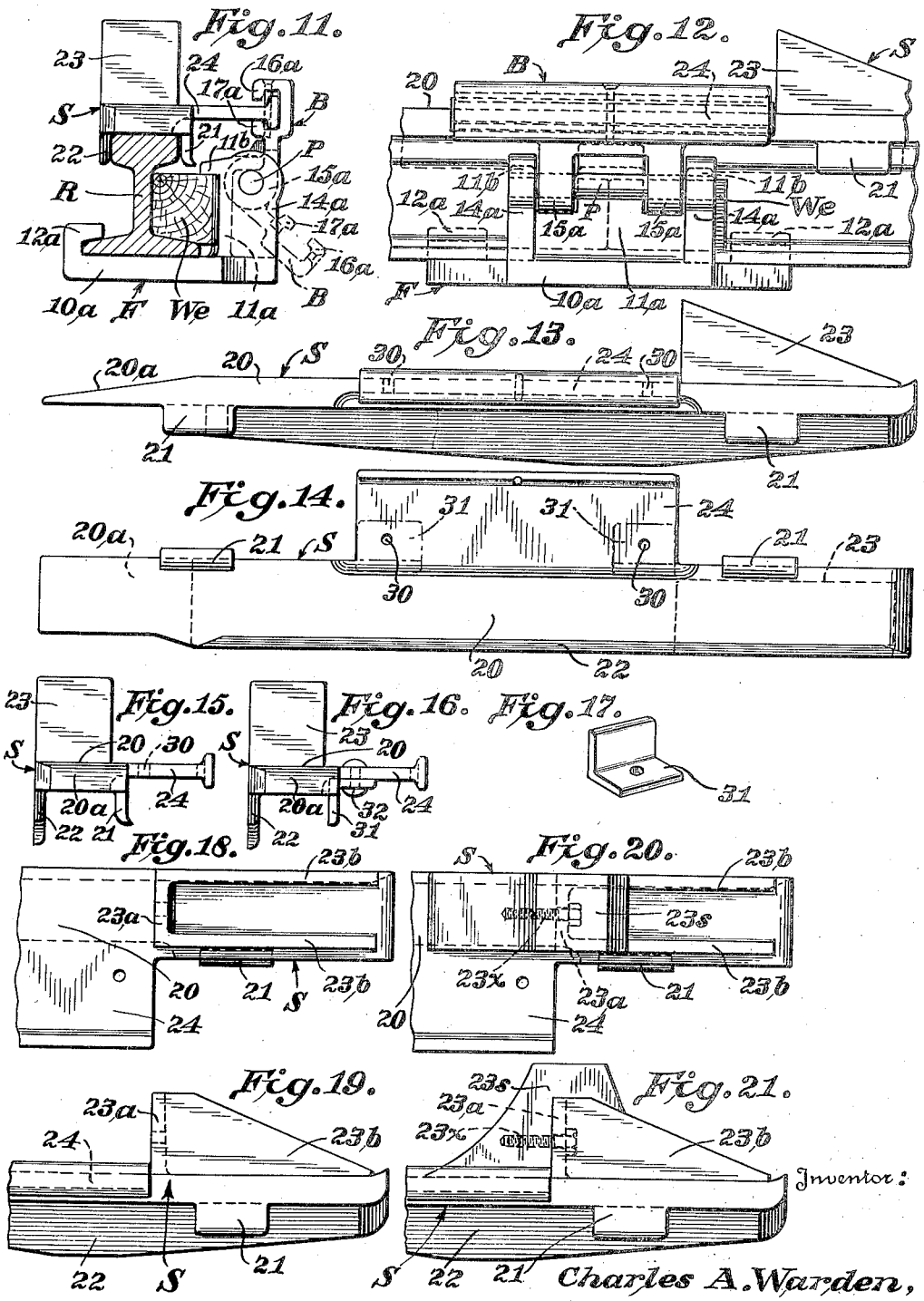

Patented Oct. 4, 1938

2,132,332

UNITED STATES PATENT OFFICE 2,132,332

CAR SKID

Charles A. Warden, Kimball, W. Va., assignor to Portable Lamp & Equipment Co., Pittsburgh, Pa., a corporation of Pennsylvania Application December 10, 1935, Serial No. 53,818

3 Claims. (Cl. 104—257)

This invention relates to devices for retarding vehicles, by introducing a friction device between a wheel and the roadway.

One of the features of this invention is the provision of a device comprising separable parts, one of which may be fixed at a determined point of the roadway and another of which is engageable by the passing vehicle and thereby separated from the fixed part and caused to travel with the vehicle while performing its stopping function thereon.

Another feature is the provision of a device in separable parts, one of which includes a member which may be fixed at a determined point and also a member secured to and movable with respect to the fixed member; and another part is engageable by the passing vehicle when the movable member is in one position and is held out of the path of the vehicle when the movable member is in another position.

A further feature is the provision of an assembly which includes a member which may be fixed to a track rail against movement therealong, a member rockable about an axis afforded on the fixed member, and a separable skid member guided by the rail and maintained thereon by a vehicle wheel while performing its stopping function and including means interengaging with the rockable member so that it can be positioned upon the rail or removed from the same, accordingly as the passing vehicle is to be brought to a standstill or permitted to advance unobstructedly.

Still another feature is the provision of a car skid comprising fixed and slidable parts so constructed and arranged that the slidable parts may be positioned upon the rail or removed therefrom, and occupying a position outside the track lines when so removed; whereby a workman need not place any part of his body within the vehicle clearance lines in order to position the slidable parts upon the rail.

With these and other features for objects in view, as will appear in the course of the following description and claims, illustrative ways of practicing the invention are shown in the accompanying drawings, in which:

Figure 1 is a side elevation of such a skid employed with a rail car, the car being in position for effecting separation of a slidable structure from a fixed structure.

Figure 2 is a similar view, showing the slidable structure separated from the fixed structure.

Figure 3 is a top plan view, on a larger scale, of the fixed and slidable structures in assembled condition.

Figure 3a is a top plan view of the base block.

Figure 4 is a side elevation of the parts shown in Figure 3.

Figure 5 is a top plan view of the slidable structure.

Figure 6 is a side elevation of the slidable structure.

Figure 7 is a section through a rack rail with the skid assembled and in position for engagement by a car.

Figure 8 is a similar view, showing the position of the slidable structure as it is moved along the rail.

Figure 9 is a similar view, with the fixed structure in non-operating position.

Figure 10 is a similar view, with the slidable and fixed structures occupying a non-operating position.

Figure 11 is a view corresponding to Fig. 7 but showing a modified form of the device.

Figure 12 is an elevation of the rocker member of Fig. 11.

Figure 13 is a side elevation of the slidable structure of Fig. 11.

Figure 14 is a bottom view of the same.

Figure 15 is an end view of the same in original condition.

Figure 16 is a similar end view, after repair.

Figure 17 is a perspective view of a repair part.

Figure 18 is a fragmentary top plan view of the slidable structure.

Figure 19 is a side elevation thereof.

Figure 20 is a top view similar to that of Fig. 18 but with a separable stop block fixed thereon.

Figure 21 is a corresponding side elevation.

In these drawings, the invention is illustrated as applied to a track rail for retarding the movement of a car along the rails from left toward right in Figs. 1 to 6, 13, 14 and 18 to 21. The car is represented as a mine car as these devices are of great value in mining operations where they serve to retard and stop cars and trips, and thus safeguard miners, particularly in mines having grades and dead ends at the foots of grades.

The rails R are supported by ties as normal and are traversed by the wheels W of the car C. The illustrated apparatus includes a member F fixed to the rail, a member B rockable upon the fixed member, and a member S detained by the rockable member B at a point of the length of the rail determined by the fixed member F and being slidable along the rail upon impact by a wheel W of the car. The greater sliding friction between the slidable member and the rail causes a retarding effort to be exerted upon the car, and has caused the apparatus to be called a "car skid".

The form of construction shown in Figs. 1 to 10 includes a fixed member F composed of a base plate 10 extending transversely beneath the rail and having an upwardly and inwardly extending toe or clip 11 which preferably is formed integral with the base plate and engages over the outer foot flange of the rail R. A separable clamping piece 12 engages the inner foot flange of the rail R and is held in position by the bolts 13; and thus the fixed member F is secured at a predetermined point along the rail. At the extreme outer edge, this illustrated base plate 10 is further provided with spaced ears 14 for receiving a pivot pin P which has its axis parallel to the rail.

The rockable member B has ears 15 engaged around the pivot pin P so that the member B may be swung from the upright position of Fig. 7 to the non-operating position of Figs. 9 and 10. The upper end of the member B has the opposed rails 16, 17 located opposite the rail R when the member is upright and providing a T-slot open toward the rail. The upper rail 16 is illustrated as having an aperture 18 for receiving a frangible locating member M when so desired. This frangible member is particularly useful when the apparatus is used on a steep grade or under other conditions where the slidable member may creep relative to the fixed member. This rockable member also has the stop piece 19 thereon which engages the fixed member F to limit the rocking movement of the member B toward the rail (Fig. 7), so that this rockable member cannot fall toward the rail when the slidable member is disengaged therefrom.

The slidable member S has a wheel-receiving portion 20 resting upon the rail and provided with an inclined entry surface or ramp 20a for facilitating the movement of the car wheel onto the member S. Extending downward from this portion 20 are the spaced guide lugs 21 for engaging the outer surface of the rail head, and the guide flange 22 for engaging the inner surface of this head and thus being presented between the rail and the flange of the corresponding car wheel: these guides operate to prevent the slidable member from leaving the rail as it slides therealong. The member S also has the wheel-engaged stop block 23 rising therefrom for impact by the car wheel. At the outer side, the member S is provided with the detaining fin 24 which has a thickened or T-end 25 received in the T-slot of the rockable member B (see Figs. 7 and 10), and being provided with an aperture 26 to receive the frangible member M as mentioned above.

In preparing the apparatus for operation, the base plate 10 is placed beneath the rail at the desired point and the clamping piece 12 is placed and tightened down by bolts 13, thus securing the fixed member F in determined location. As it is customary to have the members F and B connected, this also locates the member B at once. A slidable member S is then positioned by engaging its T-end in the T-slot provided by the guide rails 16, 17. If desired, the frangible member M can be introduced to prevent relative creepage: galvanized nails make excellent frangible members as they are cheap, do not tend to rust in place, and readily reveal their presence by the difference in color.

The assembled and located device is then ready for service. If located at the top of a grade or at the inlet to a heading, it is customary to leave it in operative position (Fig. 7).

When a car endeavors to pass the device while it is in operative position, the approaching wheel on the rail rides up on the incline or ramp 20a and passes along the top of the portion 20 of the slidable member B until it encounters the abutment or stop-block 23. It will be noted that the wheel with its weight and that of a portion of the car and its contents now rests on the top surface of the portion 20 opposite the fin 24 and between the guide lugs 21. The momentum of the car exerted as thrust against the stop-block 23 now causes the slidable member S to slip along the rail while encountering a greater frictional resistance, and transmitting this to the car, than was formerly encountered by the wheel which is now in non-rotating position thereon. The sudden impact causes also the shearing of the frangible member M when present.

The car continues in its movement under a retardation which is sufficient to bring it to a standstill upon all but the steepest grades normally employed. It will be noted that the slidable member is definitely guided by the portions 21, 22 which grip the rail. The front or right-hand end of the slidable member (Figs. 5 and 6) has curved lips so that the member can easily pass normal irregularities in the height or lateral relative location of abutting rail sections.

When the car has been brought to a standstill, it can be removed from the slidable member by simply pulling or pushing it backward (toward the left in Figs. 1 and 2). The slidable member S is brought back and reinserted into the T-slot, possibly with the insertion of a new frangible member, and the apparatus is again ready for use.

When it is desired to permit a car or trip to pass without retardation, the rockable member B and the slidable member S thereon are rocked outward and downward from the position of Fig. 7 into that of Fig. 10. The slidable member is now free of the rail and no impedance is opposed to the vehicle. The parts can easily be rocked back again to the position of Fig. 7 for the retardation of another car. It will be noted that all moving parts are located outside the track gage lines when in inoperative position, so that a miner can move the slidable member into position by hand or foot without projecting himself into the clearance of the vehicle approaching; and that his motions to remove the device for the passage of an oncoming car likewise need not involve his passing between the rails, and terminates with his hand or foot outside the track gage line. The frangible member is designed to hold the members B and S together even during these rocking movements however carelessly they may be performed, so that the apparatus is always ready for instant movement.

In the modified forms of Figs. 11 to 21, several possible variants of construction are illustrated.

In Fig. 11 the base plate 10a of the fixed member F has an integral hook portion 12a which engages over the inner foot flange of the rail, and has a deep upstanding flange 11a extending opposite the web of the rail and provided with a rib 11b at its top. The flange 11a preferably has the surface toward the rail formed so that it is closer to the rail at the center of length than at either end. A wood wedge block We therefore can be driven in from either direction between the surface and the rail web and in engagement with the rail foot and the rib 11b.

Such wooden wedges are easily manufactured and used; and this formation of the flange surface permits the block We to be driven from the end opposite to the direction of car approach, and thus any drag between the slidable member and other parts tends to increase the wedging effect. The flange 11a is provided with stiffening ribs 14a for receiving a pivot pin P.

The rockable member B has ears 15a engaged around the pin P and is provided with rails 16a, 17a which provide a T-slot; and it will be noted that in this form the center of gravity of the member B is outside (relative to the rail) the axis of the pin P, so that the member B immediately drops from the full line to the dotted line position of Fig. 11 as soon as the slidable member leaves it, thus clearing the member B from the rail R.

The slidable member S is substantially the same as in Figs. 5 and 6. However, the holes 30 are shown as having been formed therein, preferably during casting when the structure is made of cast metal. It has been found in practice that the slidable member operates excellently under all service conditions. Even when it is placed near a switch it continues to fulfill its intended function (in either form) even though the guide lugs 21 are stripped off, as the flange and tread of the car wheel hold it in position. Even after the lugs 21 are broken away, the device usually operates satisfactorily; but to assure operation under all conditions it is preferred to provide replacement guide means which may be comprised of short lengths of angle iron 31 (Fig. 17). With the form of slidable member S shown in Figs. 13 and 14, the holes 30 permit the mine blacksmith to effect a simple repair by using the rivets 32 (Fig. 16). The wheel-receiving portion 20 is preferably rather thick for strength, and it may be joined to a thinner fin 24, the lower surface of the fin extending substantially to the outer vertical surface of the rail head so that the angle iron 31 may be properly located.

The stop block of Figs. 18 to 21 is shown as having the cross web 23a and the longitudinal sloping bracing webs 23b which have a space between them. Mine cars are of various heights, and hence the height of this stop-block is designed to slip beneath the end bumpers of any normal mine car in ordinary service. In order, however, to use this apparatus also with cars having higher wheels and bumpers (that is, in order to have the point of wheel impact as close as possible to the horizontal plane through the wheel axis), a separable stop block 23s of any desired height may be positioned over the integral stop-block 23 of the illustrated forms. In order that this separable block shall remain ready for use even when the apparatus is in non-operative position, it is preferred to secure it in place by a bolt 23x which passes through the cross web 23a.

The operation of these modified forms obviously parallels that of the initially described form.

It is preferred to have the interengaging means 16, 17, 24 on the located structures and on the slidable member S presented at such a height relative to the rail that the slidable member rests firmly upon the upper surface of the rail. It is also preferred, though not essential, to have the fin 24 extending laterally away from the rail in a substantially horizontal position, as this facilitates the positioning of the members and also provides an indication to the miner of the space occupied by the device—a feature of importance in view of the low illumination intensity in mines. It will be noted that this horizontal projection of the fin 24 is not objectionable, as the slidable member is usually located wholly beneath the overhang of normal mine cars, and thus does not extend beyond the normal clearance lines of the car structure, as wheel hubs and car members extend laterally beyond it.

While these forms are illustratively set out in detail, it is obvious that the invention is not restricted thereto but may be practiced in many ways within the scope of the appended claims.

I claim:

1. A car stopping device including a base provided with means for clamping it to a rail, a rockable member on said base, a skid disposed along the top of the rail and including a wheel-engaging surface and a wheel-abutment, interengaging parts one on said rockable member and one on said skid enabling swinging thereof jointly to and from the top of the rail to a position out of the path of travel of a car, said interengaging parts being constructed and arranged whereby the skid may be mounted for detachment from the said interengaged part on the rockable member by sliding in either direction relative to the rockable member and is adapted for sliding jointly with a car wheel engaged thereon relatively to the rockable member through impact of the car wheel with the abutment, said mounting enabling positioning and operation of said skid as aforesaid in one direction or the opposite direction relative to the rockable member according to the position of the abutment and the travel of the car wheel in the said one direction or the opposite direction, the interengaged parts having aligned apertures, and a frangible element disposed in said apertures adapted for rupture upon impact of a car wheel with said abutment.

2. A car stopping device including a base provided with means for clamping it to a rail, a rockable member on said base, a skid disposed along the top of the rail and including a wheel-engaging surface and a wheel-abutment, interengaging parts one on said rockable member and one on said skid enabling swinging thereof jointly to and from the top of the rail to a position out of the path of travel of a car, said interengaging parts being constructed and arranged whereby the skid may be mounted for detachment from the said interengaged part on the rockable member by sliding in either direction relative to the rockable member and is adapted for sliding jointly with a car wheel engaged thereon relatively to the rockable member through impact of the car wheel with the abutment, said mounting enabling positioning and operation of said skid as aforesaid in one direction or the opposite direction relatively to the rockable member according to the position of the abutment and the travel of the car wheel in the said one direction or the opposite direction, the interengaged parts having aligned apertures, a frangible element disposed in said apertures adapted for rupture upon impact of a car wheel with said abutment, said skid including a downwardly extending flange engaging the inner surface of the rail, frangible guide means engaging the outer surface of the rail adapted to fracture upon encountering a switch, and means on said rockable member engageable with said base for limiting rocking movement of said rockable member toward the rail and preventing binding of the interengaging parts.

3. A car stopping device comprising a structure for attachment along a track rail, said structure having a groove open at both ends, a metallic slidable part having a wheel-receiving portion and a lateral fin separably interengaged in the groove and insertable and slidable therein in either direction, flange means on the slidable part for guiding engagement with the track rail, said groove being of substantially the same cross-section throughout, and shearable means connecting said fin in said groove against accidental detachment relative to said structure.

CHARLES A. WARDEN.